US012735078B2

(12) United States Patent
Kim

(10) Patent No.: US 12,735,078 B2
(45) Date of Patent: Sep. 15, 2026

(54) APPARATUS FOR CONTROLLING A VEHICLE AND METHOD THEREOF

(71) Applicants: HYUNDAI MOTOR COMPANY, Seoul (KR); Kia Corporation, Seoul (KR)

(72) Inventor: Dae Young Kim, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 139 days.

(21) Appl. No.: 18/813,842

(22) Filed: Aug. 23, 2024

(65) Prior Publication Data

US 2025/0153743 A1 May 15, 2025

(30) Foreign Application Priority Data

Nov. 15, 2023 (KR) ........................ 10-2023-0158468

(51) Int. Cl.
*B60W 60/00* (2020.01)

(52) U.S. Cl.
CPC ... *B60W 60/0053* (2020.02); *B60W 2520/105* (2013.01); *B60W 2540/12* (2013.01); *B60W 2540/225* (2020.02)

(58) Field of Classification Search
CPC ....... B60W 60/0053; B60W 2520/105; B60W 2540/12; B60W 2540/225; B60W 50/10;
(Continued)

(56) References Cited

U.S. PATENT DOCUMENTS 4,232,910 A * 11/1980 Snyder .................. B60T 8/1708 303/123
2004/0122578 A1* 6/2004 Isaji .......................... B60T 7/12 340/436

(Continued)

FOREIGN PATENT DOCUMENTS

CN 110667689 A * 1/2020 ........... B60R 16/023
CN 110914884 B * 8/2022 ............ B60W 40/08

OTHER PUBLICATIONS

Machine Translation of CN 110667689 A obtained from Clarivate Analytics on Mar. 6, 2026 (Year: 2020).*

(Continued)

*Primary Examiner* — Fadey S. Jabr
*Assistant Examiner* — Michael J Herrera
(74) *Attorney, Agent, or Firm* — Morgan, Lewis & Bockius LLP

(57) ABSTRACT

A device for controlling a vehicle includes a brake pedal that specifies a deceleration of a host vehicle, a steering wheel that specifies a driving direction of the host vehicle, and a processor. The processor determines that the host vehicle is under autonomous driving control, determines a brake weight based on at least one of an amount of operation of the brake pedal, a gaze of a driver, an area of an input of the driver's gripping the steering wheel, a strength of the input, a state of the host vehicle, or a deceleration value of the host vehicle controlled based on the autonomous driving, or any combination thereof, and changes a subject in control over driving of the host vehicle from a system performing the autonomous driving to the driver based on the deceleration value based on the amount of operation and the brake weight exceeding the deceleration value.

18 Claims, 17 Drawing Sheets

(58) Field of Classification Search
CPC ......... B60W 2050/0297; B60W 10/18; B60W 2050/0022; B60W 2540/223
See application file for complete search history.

(56) References Cited

U.S. PATENT DOCUMENTS

| | | | | | |
|---|---|---|---|---|---|
| 2008/0312834 | A1* | 12/2008 | Noda | B60T 7/22 | 701/301 |
| 2009/0212935 | A1* | 8/2009 | Luo | B60Q 1/535 | 340/467 |
| 2011/0190998 | A1* | 8/2011 | Kato | B60T 7/22 | 701/70 |
| 2019/0088044 | A1* | 3/2019 | Oh | G01M 15/00 | |
| 2019/0126925 | A1* | 5/2019 | Ryne | B60W 50/12 | |
| 2019/0152459 | A1* | 5/2019 | Dieckmann | B60T 13/662 | |
| 2020/0307582 | A1* | 10/2020 | Sato | B60W 50/10 | |
| 2021/0245774 | A1* | 8/2021 | Suzuki | B60T 8/171 | |
| 2022/0234591 | A1* | 7/2022 | Kuehner | B60W 60/001 | |
| 2022/0297652 | A1* | 9/2022 | van Thiel | B60T 13/36 | |

OTHER PUBLICATIONS

Machine Translation of CN 110914884 B obtained from Clarivate Analytics on Mar. 6, 2026 (Year: 2022).*

* cited by examiner

511

521

APPARATUS FOR CONTROLLING A VEHICLE AND METHOD THEREOF

CROSS-REFERENCE TO RELATED APPLICATION

The present application claims priority to Korean Patent Application No. 10-2023-0158468, filed on Nov. 15, 2023, the entire contents of which is incorporated herein for all purposes by this reference.

BACKGROUND OF THE PRESENT DISCLOSURE

Field of the Present Disclosure

The present disclosure relates to a device and a method for controlling a vehicle, and more specifically, to a technology of controlling a vehicle based on an input of a driver in the vehicle under autonomous driving control.

Description of Related Art

With a development of an autonomous driving technology, a technology of detecting a surrounding environment and an obstacle and adjusting a route becomes more sophisticated.

When performing autonomous driving for driving safety, intervention of a driver is minimized. However, in an event of a risk or an unexpected situation which is difficult for an autonomous driving device to sense, there is a need to change a subject in control over operation of a vehicle to the driver even when the autonomous driving is being performed.

Accordingly, research is being conducted on which judgment to give priority between judgment of the driver and judgment of an autonomous driving system to improve the driving safety.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device and a method for controlling a vehicle for determining whether a brake pedal has been operated based on an intention of a driver, based on a gaze of the driver under autonomous driving control.

Another aspect of the present disclosure provides a device and a method for controlling a vehicle for determining whether a brake pedal has been operated based on an intention of a driver, based on an area of an input of the driver's gripping a steering wheel under autonomous driving control.

Another aspect of the present disclosure provides a device and a method for controlling a vehicle for determining whether a brake pedal has been operated based on an intention of a driver, based on a strength of an input of gripping a steering wheel under autonomous driving control.

Another aspect of the present disclosure provides a device and a method for controlling a vehicle for determining whether a brake pedal has been operated based on an intention of a driver when in a predetermined state in which there is a need to change a subject in control over driving of a host vehicle from an autonomous driving system to a driver under autonomous driving control.

Another aspect of the present disclosure provides a device and a method for controlling a vehicle for determining whether a brake pedal has been operated based on an intention of a driver, based on a deceleration value controlled based on autonomous driving under autonomous driving control.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for controlling a vehicle includes a brake pedal that specifies a deceleration of a host vehicle, a steering wheel that specifies a driving direction of the host vehicle, and a processor.

In an exemplary embodiment of the present disclosure, the processor is configured to determine that the host vehicle is under autonomous driving control, determine a brake weight based on at least one of an amount of operation of the brake pedal, a gaze of a driver, an area of an input of the driver's gripping the steering wheel, a strength of the input, a state of the host vehicle, or a deceleration value of the host vehicle controlled based on the autonomous driving, or any combination thereof, and change a subject in control over driving of the host vehicle from a system performing the autonomous driving to the driver based on the deceleration value based on the amount of operation and the brake weight exceeding the deceleration value.

In an exemplary embodiment of the present disclosure, the processor is configured to determine the brake weight based on an amount of operation weight determined based on the amount of operation, and the amount of operation and the amount of operation weight may have a correlation, in which the amount of operation weight increases as the amount of operation increases in a state that the amount of operation is included in a predetermined amount of operation range.

In an exemplary embodiment of the present disclosure, the processor may determine, as a direction weight, a first value determined based on a point corresponding to the gaze of the driver is included in a predetermined area, determine, as the direction weight, a second value determined based on the point not included in the predetermined area, and determine the brake weight based on the direction weight. The first value may be greater than the second value.

In an exemplary embodiment of the present disclosure, the processor is configured to determine an angle between a straight line corresponding to a direction of the gaze of the driver and a straight line for connecting a point corresponding to the predetermined area with the driver, and determine the brake weight based on an angle weight determined based on the angle. The angle and the angle weight may have a correlation, in which the angle weight decreases as the angle increases.

In an exemplary embodiment of the present disclosure, the processor is configured to determine a shortest distance among distances from a point on a windshield of the host vehicle corresponding to a direction of the gaze of the driver to a boundary of the predetermined area, and determine the brake weight based on a distance weight determined based on the shortest distance. The shortest distance and the distance weight may have a correlation, in which the distance weight decreases as the shortest distance increases.

In an exemplary embodiment of the present disclosure, the processor is configured to determine the brake weight based on an area weight determined based on the area. The area and the area weight may have a correlation, in which the area weight increases as the area increases.

In an exemplary embodiment of the present disclosure, the processor is configured to determine the brake weight based on a strength weight determined based on the strength. The strength and the strength weight may have a correlation, in which the strength weight increases as the strength increases.

In an exemplary embodiment of the present disclosure, the processor may determine, as a state weight, a third value determined based on the host vehicle not being in a predetermined first state and a predetermined second state, determine, as the state weight, a fourth value determined based on the host vehicle being in the first state, determine, as the state weight, a fifth value determined based on the host vehicle being in the second state, and determine the brake weight based on the state weight. The third value may be smaller than the fourth value, and the fourth value may be smaller than the fifth value, the first state may include a state where there is a need to change the subject in the control over the driving of the host vehicle from the system performing the autonomous driving to the driver because of a cause other than a failure of an autonomous driving device, and the second state may include a state where there is a need to change the subject in the control over the driving of the host vehicle from the system performing the autonomous driving to the driver because of the failure.

In an exemplary embodiment of the present disclosure, the processor is configured to determine the brake weight based on a deceleration weight determined based on the deceleration value. The deceleration value and the deceleration weight may have a correlation, in which the deceleration weight increases as the deceleration value increases when the deceleration value is included in a predetermined deceleration range.

In an exemplary embodiment of the present disclosure, the processor is configured for controlling a speed of the host vehicle based on a deceleration determined based on the amount of operation, based on the deceleration value determined based on the amount of operation and the brake weight exceeding the deceleration value.

In an exemplary embodiment of the present disclosure, the processor is configured for controlling a speed of the host vehicle at a predetermined time point based on a deceleration determined based on a difference between the deceleration value determined based on the amount of operation and the brake weight and the deceleration value controlled based on the autonomous driving, and a time duration from when the subject in the control is changed to the driver to the predetermined time point, based on the deceleration value determined based on the amount of operation and the brake weight exceeding the deceleration value controlled based on the autonomous driving.

According to another aspect of the present disclosure, a method for controlling a vehicle includes determining that a host vehicle is under autonomous driving control, determining a brake weight based on at least one of an amount of operation of a brake pedal, a gaze of a driver, an area of an input of the driver's gripping a steering wheel, a strength of the input, a state of the host vehicle, or a deceleration value of the host vehicle controlled based on the autonomous driving, or any combination thereof, and changing a subject in control over driving of the host vehicle from a system performing the autonomous driving to the driver based on the deceleration value based on the amount of operation and the brake weight exceeding the deceleration value.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining the brake weight based on an amount of operation weight determined based on the amount of operation. The amount of operation and the amount of operation weight may have a correlation, in which the amount of operation weight increases as the amount of operation increases in a state that the amount of operation is included in a predetermined amount of operation range.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining, as a direction weight, a first value determined based on a point corresponding to the gaze of the driver is included in a predetermined area, determining, as the direction weight, a second value determined based on the point not included in the predetermined area, and determining the brake weight based on the direction weight. The first value may be greater than the second value.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining an angle between a straight line corresponding to a direction of the gaze of the driver and a straight line for connecting a point corresponding to the predetermined area with the driver, and determining the brake weight based on an angle weight determined based on the angle. The angle and the angle weight may have a correlation, in which the angle weight decreases as the angle increases.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining a shortest distance among distances from a point on a windshield of the host vehicle corresponding to a direction of the gaze of the driver to a boundary of the predetermined area, and determining the brake weight based on a distance weight determined based on the shortest distance. The shortest distance and the distance weight may have a correlation, in which the distance weight decreases as the shortest distance increases.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining the brake weight based on an area weight determined based on the area. The area and the area weight may have a correlation, in which the area weight increases as the area increases.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining the brake weight based on a strength weight determined based on the strength. The strength and the strength weight may have a correlation, in which the strength weight increases as the strength increases.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining, as a state weight, a third value determined based on the host vehicle not being in a predetermined first state and a predetermined second state, determining, as the state weight, a fourth value determined based on the host vehicle being in the first state, determining, as the state weight, a fifth value determined based on the host vehicle being in the second state, and determining the brake weight based on the state weight. The third value may be smaller than the fourth value, and the fourth value may be smaller than the fifth value. The first state may include a state where there is a need to change the subject in the control over the driving of the host vehicle from the system performing the autonomous driving to the driver because of a cause other than a failure of an autonomous driving device. The second state may include a state where there is a need to change the subject in the control over the driving of the host vehicle from the system performing the autonomous driving to the driver because of the failure.

In an exemplary embodiment of the present disclosure, the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof may include determining the brake weight based on a deceleration weight determined based on the deceleration value. The deceleration value and the deceleration weight may have a correlation, in which the deceleration weight increases as the deceleration value increases when the deceleration value is included in a predetermined deceleration range.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
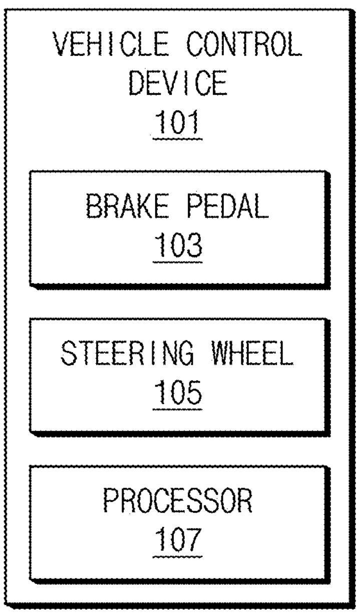
FIG. 1 is a block diagram showing a configuration of a vehicle control device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, various exemplary embodiments of the present disclosure will be described in detail with reference to FIGS. 1 to 10.

FIG. 1 is a block diagram showing a configuration of a vehicle control device according to an exemplary embodiment of the present disclosure.

A vehicle control device 101 according to an exemplary embodiment of the present disclosure may be implemented inside or outside a vehicle, and some of components included in the vehicle control device 101 may be implemented inside or outside the vehicle.

Referring to FIG. 1, the vehicle control device 101 may include at least one of a brake pedal 103, a steering wheel 105, or a processor 107, or any combination thereof. At least one of the brake pedal 103, the steering wheel 105, or the processor 107, or any combination thereof may be electronically and/or operatively connected to each other by an electronic component such as a communication bus.

According to an exemplary embodiment of the present disclosure, hereinafter, operational coupling of hardware components may mean that a direct or indirect connection between the hardware components is established in a wired or wireless manner such that among the hardware components, second hardware is controlled by first hardware. Types and/or the numbers of hardware components included in the vehicle control device 101 are not limited to those shown in FIG. 1. For example, the vehicle control device 101 may include only some of the hardware components shown in FIG. 1.

According to an exemplary embodiment of the present disclosure, the brake pedal 103 may be operated by a driver to specify a deceleration of a host vehicle. The processor 107 of the vehicle control device 101 may obtain an input of the driver for decelerating the host vehicle via the brake pedal 103, and change a driving speed of the host vehicle based on the input of the driver for decelerating the host vehicle.

According to an exemplary embodiment of the present disclosure, the steering wheel 105 may be operated by the driver to specify a driving direction of the host vehicle. The processor 107 of the vehicle control device 101 may adjust an operating state of the host vehicle based on the steering wheel 105. For example, the processor 107 of the vehicle control device 101 may obtain an input of the driver for changing the driving direction of the host vehicle via the steering wheel 105, and changes the driving direction of the host vehicle based on the input of the driver for changing the driving direction thereof.

According to an exemplary embodiment of the present disclosure, the processor 107 of the vehicle control device 101 may be configured to determine that the host vehicle is under autonomous driving control.

When the host vehicle including an existing vehicle control device is under the autonomous driving control, based on a deceleration value based on an amount of operation of the brake pedal exceeding a deceleration value of the host vehicle controlled based on the autonomous driving, a processor of the existing vehicle control device may change a subject in control over the driving of the host vehicle from a system that performs the autonomous driving to the driver. The control over the driving of the host vehicle may include control over the driving direction of the host vehicle or control over the driving speed of the host vehicle.

When the host vehicle including the existing vehicle control device is driving at a constant speed, even when the driver operates the brake pedal with an amount of operation smaller than a specified value, regardless of intention of the driver, the processor of the existing vehicle control device may change the subject in the control over the driving of the host vehicle from the system that performs the autonomous driving to the driver. Therefore, according to the existing vehicle control device, convenience of the driver may be reduced and a risk of an accident may increase because of operation of the brake pedal unintended by the driver.

To improve the convenience of the driver and reduce the risk of the accident, when a probability that the brake pedal 103 has been operated based on the intention of the driver is below a reference value, the processor 107 of the vehicle control device 101 according to various exemplary embodiments of the present disclosure may not change the subject in the control over the driving of the host vehicle from the system that performs the autonomous driving to the driver based on the operation of the brake pedal 103. When the probability that the brake pedal 103 has been operated based on the intention of the driver exceeds the reference value, the processor 107 of the vehicle control device 101 according to various exemplary embodiments of the present disclosure may change the subject in the control over the driving of the host vehicle from the system that performs the autonomous driving to the driver based on the operation of the brake pedal 103. The control over the driving of the host vehicle may include control over the driving direction of the host vehicle or the control over the driving speed of the host vehicle.

According to an exemplary embodiment of the present disclosure, to determine whether the probability that the brake pedal 103 has been operated based on the intention of the driver exceeds the reference value, the processor 107 of the vehicle control device 101 may be configured to determine a brake weight based on at least one of the amount of operation of the brake pedal 103, a gaze direction of the driver, an area of an input of the driver's gripping the steering wheel 105, a strength of the input of gripping the steering wheel 105, a state of the host vehicle, or the deceleration value controlled based on the autonomous driving, or any combination thereof.

According to an exemplary embodiment of the present disclosure, when the driver operates the brake pedal 103, the processor 107 of the vehicle control device 101 may change the subject in the control over the driving of the host vehicle from the system that performs the autonomous driving to the driver based on the deceleration value based on the amount of operation and the brake weight exceeding the deceleration value controlled based on the autonomous driving.

According to an exemplary embodiment of the present disclosure, the processor 107 of the vehicle control device 101 may be configured to determine the brake weight based on at least one of an amount of operation weight determined based on the amount of operation of the brake pedal 103, a direction weight determined based on the gaze direction of the driver, an angle weight determined based on the gaze direction of the driver, a distance weight determined based on the gaze direction of the driver, an area weight determined based on the area of the input of the driver's gripping the steering wheel, a strength weight determined based on the strength of the input of gripping the steering wheel, a state weight determined based on the state of the host vehicle, or a deceleration weight determined based on the deceleration value of the host vehicle controlled based on the autonomous driving, or any combination thereof. According to an exemplary embodiment of the present disclosure, the brake weight may include a number between 0 and 1. According to another exemplary embodiment of the present disclosure, the brake weight may include a number expressed as a percentage between 0% and 100%.

Hereinafter, in FIGS. 3 to 7, a method for determining a brake weight will be described in detail.

Driving using the vehicle control device according to various exemplary embodiments of the present disclosure may reduce the risk of the accident resulted from the operation of the brake pedal unintended by the driver, compared to existing manual driving or driving using an existing advanced driver assistance system (ADAS).

Figure 2:
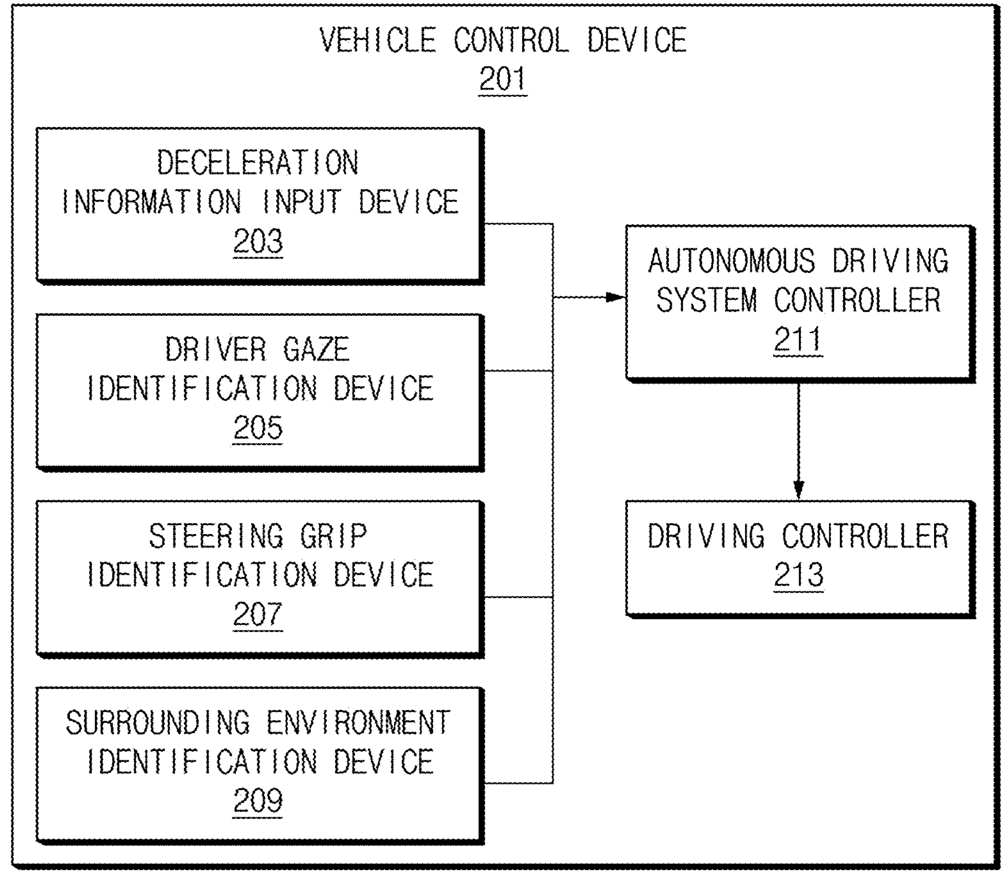
FIG. 2 is a block diagram showing a configuration of a vehicle control device according to an exemplary embodiment of the present disclosure in detail.

FIG. 2 is a block diagram showing a configuration of a vehicle control device according to an exemplary embodiment of the present disclosure in detail.

A vehicle control device 201 according to an exemplary embodiment of the present disclosure may be implemented inside or outside the vehicle, and some of components included in the vehicle control device 201 may be implemented inside or outside the vehicle.

Referring to FIG. 2, the vehicle control device 201 may include at least one of a deceleration information input device 203, a driver gaze identification device 205, a steering grip identification device 207, a surrounding environment identification device 209, an autonomous driving system controller 211, or a driving controller 213, or any combination thereof. At least one of the deceleration information input device 203, the driver gaze identification device 205, the steering grip identification device 207, the surrounding environment identification device 209, the autonomous driving system controller 211, or the driving controller 213, or any combination thereof may be electrically and/or operatively connected to each other via an electronic component, such as a communication bus.

Types and/or the number of hardware components included in the vehicle control device 201 are not limited to those shown in FIG. 2. For example, the vehicle control device 201 may include only some of the hardware components shown in FIG. 2.

According to an exemplary embodiment of the present disclosure, a processor of the vehicle control device 201 may be configured to determine whether the probability that the brake pedal has been operated based on the intention of the driver exceeds the reference value based on information determined from the deceleration information input device 203, the driver gaze identification device 205, the steering grip identification device 207, and the surrounding environment identification device 209.

According to an exemplary embodiment of the present disclosure, when identifying the operation of the brake pedal based on the intention of the driver, the vehicle control device 201 may change the subject in the control over the driving of the host vehicle from the system that performs the autonomous driving to the driver. When the driver is granted the control over the operation, the driving controller 213 may be configured for controlling the driving speed of the host vehicle with the driving direction determined based on an amount of operation of the steering wheel.

According to an exemplary embodiment of the present disclosure, the deceleration information input device 203 may identify the amount of operation of the brake pedal. For example, the deceleration information input device 203 may include brake pedal position sensor, or brake pedal sensor.

According to an exemplary embodiment of the present disclosure, the driver gaze identification device 205 may be configured to determine the direction in which the gaze of the driver is directed via a camera for obtaining an image containing the driver. For example, the driver gaze identification device 205 may be configured to determine a point toward which the gaze of the driver is directed on a windshield of the host vehicle via the camera, and determine whether the gaze of the driver is directed in a specified direction based on the point toward which the gaze of the driver is directed being included in a specified area on the windshield (e.g., an area corresponding to a room mirror, an area corresponding to a lane where the host vehicle is located, and a certain area on the windshield).

According to an exemplary embodiment of the present disclosure, the driver gaze identification device 205 may be configured to determine a degree to which a point corresponding to the specified area matches the point toward which the gaze of the driver is directed via the camera. For example, the driver gaze identification device 205 may be configured to determine the degree to which the point corresponding to the specified area matches the point toward which the gaze of the driver is directed based on an angle between a straight line corresponding to the gaze direction of the driver and a straight line that connects the point corresponding to the specified area with the driver. For another example, the driver gaze identification device 205 may be configured to determine the degree to which the point corresponding to the specified area matches the point toward which the gaze of the driver is directed based on the shortest distance among distances from a point on the windshield of the host vehicle corresponding to the gaze direction of the driver to a border of the specified area.

According to an exemplary embodiment of the present disclosure, the steering grip identification device 207 may identify the area of the input of gripping the steering wheel of the driver. For example, the steering grip identification device 207 may identify the strength of the input of gripping the steering wheel. For example, the steering grip identification device 207 may be configured to determine whether the grip is made with one hand, both hands, or not made. For example, the steering grip identification device 207 may identify the strength of the input of gripping the steering wheel. The strength of the input of gripping the steering wheel may be identified via a touch sensor included in the steering wheel. The touch sensor may include a pressure sensor or a capacitive sensor.

According to an exemplary embodiment of the present disclosure, the surrounding environment identification device 209 may identify a location or a speed of an external object. For example, the surrounding environment identification device 209 may identify a location and a speed of a surrounding vehicle.

According to an exemplary embodiment of the present disclosure, the surrounding environment identification device 209 may include camera, radio detection and ranging (RADAR), or a Light Detection and Ranging (LiDAR).

According to an exemplary embodiment of the present disclosure, the autonomous driving system controller 211 may be configured to determine the driving speed or the driving direction of the host vehicle based on the location or the speed of the external object obtained by the surrounding environment identification device 209. According to an exemplary embodiment of the present disclosure, the autonomous driving system controller 211 may be configured to determine the deceleration of the host vehicle based on the location or the speed of the external object obtained by the surrounding environment identification device 209. The autonomous driving system controller 211 may transmit setting values required for the operation to the driving controller 213, wherein the setting values is determined based on information necessary for driving, such as a surrounding environment, a legal condition, and a road condition.

According to an exemplary embodiment of the present disclosure, the autonomous driving system controller 211 may be configured to determine whether the condition of the vehicle is there is the need to change the subject in the control over the driving of the host vehicle from the system that performs the autonomous driving to the driver based on a cause other than a failure of the autonomous driving device, whether the condition of the vehicle is there is the need to change the subject in the control over the driving of the host vehicle from the system that performs the autonomous driving to the driver based on a cause other than a failure of the autonomous driving device, or whether the condition of the vehicle is there is not the need to change the subject in the control over the driving of the host vehicle from the system that performs the autonomous driving to the driver. In other words, the autonomous driving system controller 211 may be configured to determine whether the condition of the vehicle is there is first state, whether the condition of the vehicle is there is second state, whether the condition of the vehicle is there is third state.

According to an exemplary embodiment of the present disclosure, the driving controller 213 may operate the host vehicle based on a driving command received from the autonomous driving system controller 211. The driving controller 213 may operate the host vehicle based on operation of the driver when the driver is granted the control over the driving of the host vehicle.

Figure 3A:
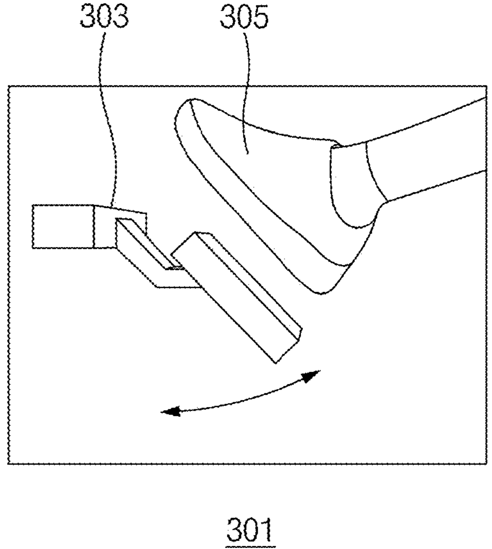
FIG. 3A, FIG. 3B and FIG. 3C show examples of amount of operation weight determination based on an amount of operation of a brake pedal in a vehicle control device or a vehicle control method according to an exemplary embodiment of the present disclosure.
Figure 3B:
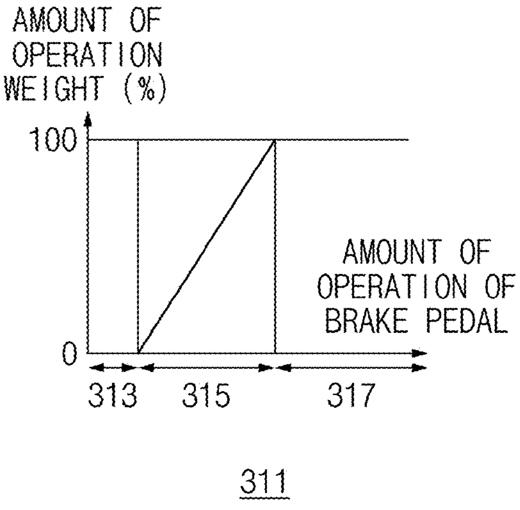
Figure 3C:
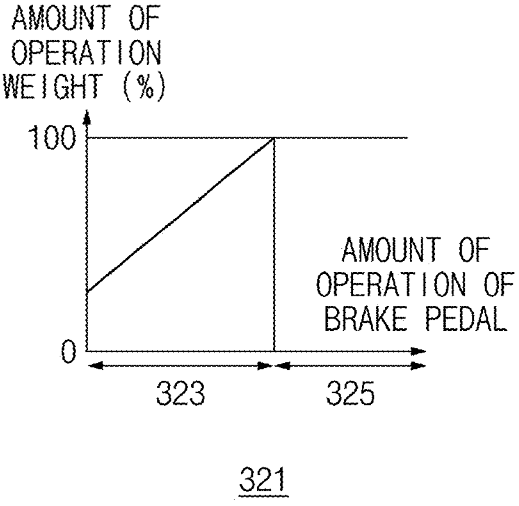

FIG. 3A, FIG. 3B and FIG. 3C show examples of amount of operation weight determination based on an amount of operation of a brake pedal in a vehicle control device or a vehicle control method according to an exemplary embodiment of the present disclosure. The processor of the vehicle control device may be configured to determine the brake weight based on the amount of operation weight.

Referring to FIG. 3A, in a situation 301, a brake pedal 303 may be operated by a driver 305. A first graph 311 and a second graph 321 in FIG. 3B and FIG. 3C may represent amount of operation weights based on an amount of operation of the brake pedal 303. The first graph 311 may be classified into a first section 313, a second section 315, and a third section 317 based on a relationship between the amount of brake pedal operation and the amount of operation weight. The second graph 321 may be classified into a first section 323 and a second section 325 based on a relationship between the amount of brake pedal operation and the amount of operation weight.

According to an exemplary embodiment of the present disclosure, in the first section 313 of the first graph 311, the amount of operation weight based on the amount of operation of the brake pedal 303 may represent a value (e.g., about 0%) equal to or lower than a reference amount of operation weight. This is because a probability that the brake pedal 303 has been operated based on the intention of the driver when the brake pedal 303 is operated with an amount of operation equal to or lower than a specified first value is lower than a probability that the brake pedal 303 has been operated based on the intention of the driver when the brake pedal 303 is operated with an amount of operation exceeding the specified first value. Accordingly, the processor of the vehicle control device may lower the brake weight by setting the amount of operation weight to the value equal to or lower than the standard amount of operation weight.

According to an exemplary embodiment of the present disclosure, in the second section 315 of the first graph 311, the amount of operation weight based on the amount of operation of the brake pedal 303 may have a correlation in which the amount of operation weight increases as the amount of operation increases. This is because as the amount of operation of the brake pedal 303 increases, the probability that the brake pedal 303 has been operated based on the intention of the driver increases. Therefore, the processor of the vehicle control device may set the amount of operation weight to increase proportionally as the amount of operation of the brake pedal increases, increasing the brake weight as the amount of operation of the brake pedal increases.

According to an exemplary embodiment of the present disclosure, in the third section 317 of the first graph 311, the amount of operation weight based on the amount of operation of the brake pedal 303 may represent a value (e.g., about 100%) exceeding the reference amount of operation weight. This is because, when the brake pedal 303 is operated with an amount of operation exceeding a specified second value, it may be considered that the brake pedal 303 has been operated based on the intention of the driver. Accordingly, the processor of the vehicle control device may increase the brake weight by setting the amount of operation weight to a value exceeding the reference amount of operation weight.

According to another exemplary embodiment of the present disclosure, the amount of operation weight based on the amount of operation of the brake pedal 303 in the first section 323 of the second graph 321 may have a correlation in which the amount of operation weight increases as the amount of operation increases, like the amount of operation weight in the second section 315 of the first graph 311.

According to an exemplary embodiment of the present disclosure, the amount of operation weight based on the amount of operation of the brake pedal 303 in the second section 325 of the second graph 321 may represent a value (e.g., about 100%) exceeding the reference amount of operation weight like the amount of operation weight in the third section 317 of the first graph 311.

Figure 4A:
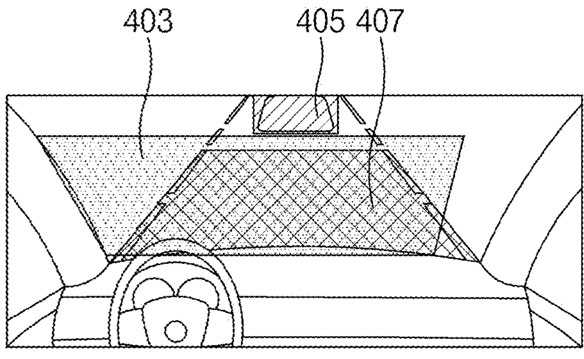
FIG. 4A, FIG. 4B and FIG. 4C show examples of weight determination based on a gaze direction of a driver in a vehicle control device or a vehicle control method according to an exemplary embodiment of the present disclosure.
Figure 4B:
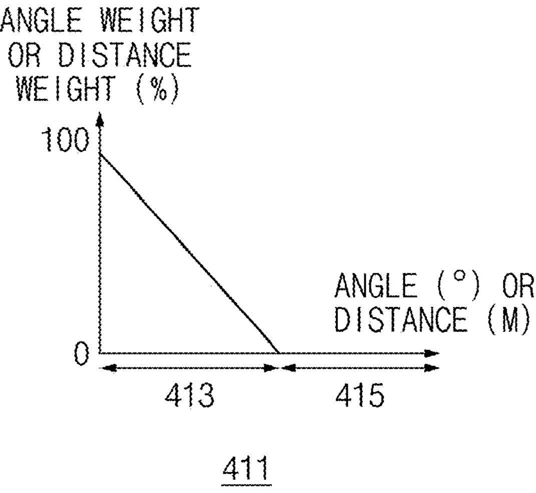
Figure 4C:
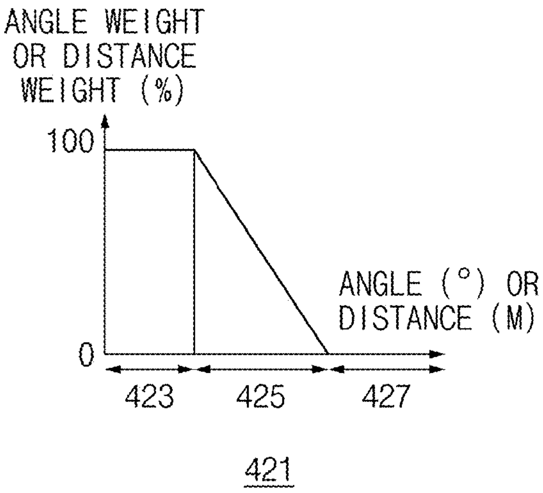

FIG. 4A, FIG. 4B and FIG. 4C show examples of weight determination based on a gaze direction of a driver in a vehicle control device or a vehicle control method according to an exemplary embodiment of the present disclosure. The processor of the vehicle control device may be configured to determine the brake weight based on a weight determined based on the gaze of the driver.

Referring to FIG. 4A, in a situation 401, the point corresponding to the gaze of the driver may be included in a first area 403, a second area 405, or a third area 407. The first area 403 may represent the specified area on the windshield of the host vehicle. The second area 405 may represent the area corresponding to the room mirror. The third area 407 may represent the area corresponding to the lane where the host vehicle is located.

A first graph 411 and a second graph 421 in FIGS. 4B and 4C may represent a weight corresponding to a driver gaze variable, based on a magnitude of a variable (hereinafter, the driver gaze variable) representing the degree to which the point based on the specified area matches the point toward which the gaze of the driver is directed. The first graph 411 may be classified into a first section 413 and a second section 415 based on a relationship between the driver gaze variable and the weight corresponding to the driver gaze variable. The second graph 421 may be classified into a first section 423, a second section 425, and a third section 427 based on the relationship between the driver gaze variable and the weight corresponding to the driver gaze variable.

According to an exemplary embodiment of the present disclosure, the processor of the vehicle control device may be configured to determine whether the point toward which the gaze of the driver is directed is included in the specified area (e.g., the first area 403, the second area 405, or the third area 407) or the degree to which the point based on the specified area matches the point in which the gaze of the driver is directed, based on the magnitude of the driver gaze variable identified via the camera.

According to an exemplary embodiment of the present disclosure, the processor of the vehicle control device may be configured to determine the first value determined based on the point corresponding to the gaze of the driver being included in the specified area as the direction weight. The processor of the vehicle control device may be configured to determine the second value determined based on the point corresponding to the gaze of the driver not being included in the specified area smaller than the first value as the direction weight. The processor of the vehicle control device may be configured to determine brake weight based on the direction weight. For example, the processor of the vehicle control device may be configured to determine the direction weight as the brake weight.

This is because a probability that the brake pedal has been operated based on the intention of the driver when the point corresponding to the gaze of the driver is included in the specified area is higher than a probability that the brake pedal has been operated based on the intention of the driver when the point corresponding to the gaze of the driver is not included in the specified area.

According to an exemplary embodiment of the present disclosure, the direction weight may be identified as in Table 1 below, but the exemplary embodiment of the present disclosure may not be limited thereto. According to an exemplary embodiment of the present disclosure, a direction weight when the gaze direction of the driver is a forward direction and a direction weight when the gaze direction of the driver is not the forward direction may be changed.

Whether the gaze direction of the driver is the forward direction may be determined based on whether the point corresponding to the gaze of the driver is included in the specified area (e.g., the first area 403, the second area 405, or the third area 407).

TABLE 1

| Gaze direction of driver | Direction weight |
|---|---|
| Forward direction | Specified value about 100% |
| Direction not the forward direction | Specified value equal to or greater than 0% and lower than about 50% |

According to an exemplary embodiment of the present disclosure, the processor of the vehicle control device may be configured to determine the degree to which the point based on the specified area matches the point toward which the gaze of the driver is directed based on the magnitude of the driver gaze variable identified via the camera. For example, the driver gaze variable may include the angle (hereinafter, referred to as the angle) between the straight line corresponding to the gaze direction of the driver and the straight line that connects the point (e.g., a specific point within the area) corresponding to the specified area (e.g., the first area 403, the second area 405, or the third area 407) with the driver. As the angle increases, the degree to which the point based on the specified area matches the point toward which the gaze of the driver is directed may decrease.

For another example, the driver gaze variable may include the shortest distance (hereinafter, referred to as a distance) among the distances from the point on the windshield of the host vehicle corresponding to the gaze direction of the driver to the boundary of the specified area. As the distance increases, the degree to which the point based on the specified area matches the point toward which the gaze of the driver is directed may decrease.

According to an exemplary embodiment of the present disclosure, the processor of the vehicle control device may be configured to determine the brake weight based on the weight (e.g., the angle weight or the distance weight) corresponding to the driver gaze variable, based on the magnitude of the driver gaze variable (e.g., the angle or the distance).

According to an exemplary embodiment of the present disclosure, in the first section 413 of the first graph 411, the driver gaze variable (e.g., the distance or the angle) and the weight (e.g., the angle weight or the distance weight) corresponding to the driver gaze variable may have a correlation in which the weight corresponding to the driver gaze decreases as the magnitude of the driver gaze variable increases. This is because, as the magnitude of the driver gaze variable (e.g., the angle or the distance) increases, the probability that the brake pedal has been operated based on the intention of the driver decreases.

Therefore, the processor of the vehicle control device may reduce the brake weight as the magnitude of the driver gaze variable increases by setting the weight (e.g., the angle weight or the distance weight) corresponding to the gaze of the driver to decrease as the magnitude of the driver gaze variable increases.

According to an exemplary embodiment of the present disclosure, in the second section 415 of the first graph 411, the weight (e.g., the angle weight or the distance weight) corresponding to the driver gaze variable based on the magnitude of the driver gaze variable (e.g., the angle or the distance) exceeding a third specified value may represent a value (e.g., about 0%) equal to or lower than a reference weight (e.g., a reference angle weight or a reference distance weight) corresponding to the gaze of the driver.

This is because, when it is determined that the magnitude of the driver gaze variable exceeds the third specified value, it may be considered that the brake pedal has not been operated based on the intention of the driver. Accordingly, the processor of the vehicle control device may reduce the brake weight by setting the weight corresponding to the gaze of the driver to the value (e.g., about 0%) equal to or lower than the reference weight (e.g., the reference angle weight or the reference distance weight).

According to another exemplary embodiment of the present disclosure, in the first section 423 of the second graph 421, the weight (e.g., the angle weight or the distance weight) corresponding to the driver gaze variable based on the magnitude of the driver gaze variable (e.g., the distance or the angle) equal to or lower than a fourth specified value may represent a value (e.g., about 100%) exceeding the reference weight (e.g., the reference angle weight or the reference distance weight) corresponding to the gaze of the driver.

This is because, when the magnitude of the driver gaze variable (e.g., the distance or the angle) is equal to or lower than the fourth specified value, it may be considered that the brake pedal has been operated based on the intention of the driver. Accordingly, the processor of the vehicle control device may increase the brake weight based on the weight corresponding to the driver gaze variable by setting the weight corresponding to the driver gaze variable to the value exceeding the reference weight corresponding to the gaze of the driver.

According to an exemplary embodiment of the present disclosure, in the second section 425 of the second graph 421, the driver gaze variable (e.g., the distance or the angle) and the weight (e.g., the angle weight or the distance weight) corresponding to the driver gaze variable may have a correlation in which the weight corresponding to the gaze of the driver decreases as the magnitude of the driver gaze variable increases.

According to an exemplary embodiment of the present disclosure, in the third section 427 of the second graph 421, the weight (e.g., the angle weight or the distance weight) corresponding to the driver gaze variable based on the magnitude of the driver gaze variable (e.g., the angle or the distance) exceeding a fifth specified value may represent a value (e.g., about 0%) equal to or lower than the reference weight (e.g., the reference angle weight or the reference distance weight) corresponding to the gaze of the driver.

Figure 5A:
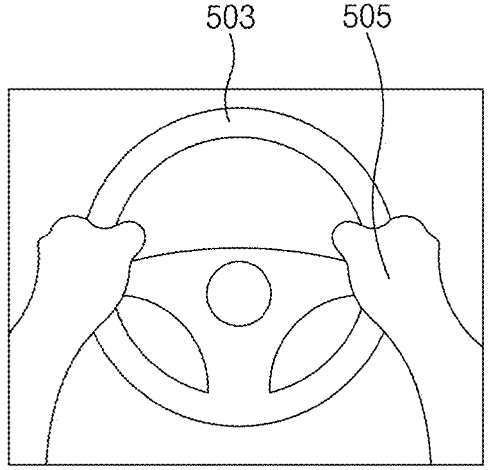
FIG. 5A, FIG. 5B and FIG. 5C show examples of weight determination based on an input of gripping a steering wheel in a vehicle control device or a vehicle control method according to an exemplary embodiment of the present disclosure.
Figure 5B:
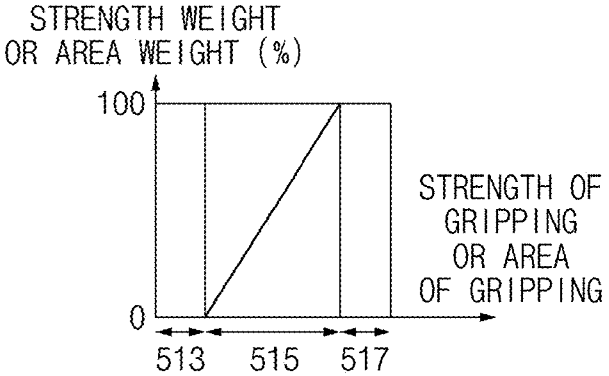
Figure 5C:
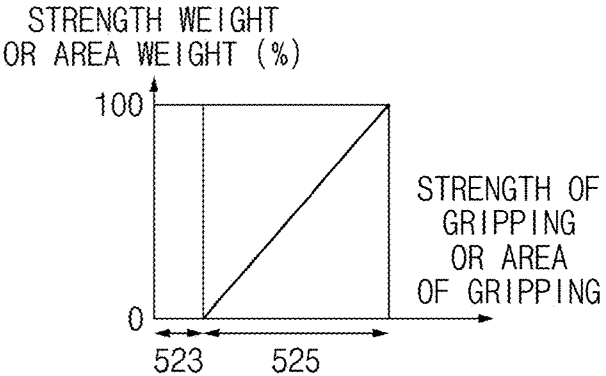

FIG. 5A, FIG. 5B and FIG. 5C show examples of weight determination based on an input of gripping a steering wheel in a vehicle control device or a vehicle control method according to an exemplary embodiment of the present disclosure. The processor of the vehicle control device may be configured to determine the brake weight based on the weight based on the input of gripping the steering wheel.

Referring to FIG. 5A, in a situation 501, an input of a driver 505 of gripping a steering wheel 503 may occur. A first graph 511 and a second graph 521 in FIGS. 5B and 5C may represent weights corresponding to gripping variables based on a magnitude of a variable (hereinafter, the gripping variable) representing a state of the input of gripping. The first graph 511 may be classified into a first section 513, a second section 515, and a third section 517 based on a relationship between the gripping variable and the weight corresponding to the gripping variable. The second graph 521 may be classified into a first section 523 and a second section 525 based on the relationship between the gripping variable and the weight corresponding to the gripping variable.

According to an exemplary embodiment of the present disclosure, the processor of the vehicle control device may be configured to determine whether the brake pedal has been operated based on the intention of the driver based on the magnitude of the gripping variable. For example, the gripping variable may include an area (hereinafter, referred to as an area) of the input of the driver 505 of gripping the steering wheel 503. For example, an area when the steering wheel 503 is gripped with both hands may be greater than an area when the steering wheel 503 is gripped with one hand. The area when the steering wheel 503 is gripped with the one hand may be greater than an area when the steering wheel 503 is not gripped. As the area increases, the probability that the brake pedal has been operated based on the intention of the driver may increase.

For another example, the gripping variable may include a strength (hereinafter, a strength) of the input of the driver 505 of gripping the steering wheel 503. The stronger the driver 505 grips the steering wheel 503, the greater the strength of the input of gripping the steering wheel 503. As the strength increases, the probability that the brake pedal has been operated based on the intention of the driver may increase.

According to an exemplary embodiment of the present disclosure, the processor of the vehicle control device may be configured to determine the brake weight based on the weight (e.g., the area weight or the strength weight) corresponding to the gripping variable based on the magnitude of the gripping variable (e.g., the area or the strength).

According to an exemplary embodiment of the present disclosure, in the first section 513 of the first graph 511, the weight corresponding to the gripping variable based on the magnitude of the gripping variable (e.g., the area or the strength) may represent a value (e.g., about 0%) equal to or lower than the reference weight corresponding to the gripping variable.

This is because a probability that the brake pedal has been operated based on the intention of the driver when the magnitude of the gripping variable is identified as being equal to or lower than a sixth specified value is lower than a probability that the brake pedal has been operated based on the intention of the driver when the magnitude of the gripping variable is identified as exceeding the sixth specified value. Accordingly, the processor of the vehicle control device may lower the brake weight by setting the weight corresponding to the gripping variable to the value (e.g., about 0%) equal to or lower than the reference weight corresponding to the gripping variable.

According to an exemplary embodiment of the present disclosure, in the second section 515 of the first graph 511, the gripping variable (e.g., the area or the strength) and the weight (e.g., the area weight or the strength weight) corresponding to the gripping variable may have a correlation in which the weight corresponding to the gripping variable increases as the magnitude of the weight increases. This is because, as the magnitude of the gripping variable increases, the probability that the brake pedal has been operated based on the intention of the driver increases.

Therefore, the processor of the vehicle control device may increase the brake weight as the magnitude of the gripping variable increases by setting the weight corresponding to the gripping variable to increase proportionally as the magnitude of the gripping variable (e.g., the area or the strength) increases.

According to an exemplary embodiment of the present disclosure, in the third section 517 of the first graph 511, the gripping variable (e.g., the area or the strength) and the weight corresponding to the gripping variable may represent a value (e.g., about 100%) exceeding the reference weight corresponding to the gripping variable. This is because, when the magnitude of the gripping variable exceeds a seventh specified value, it may be considered that the brake pedal has been operated based on the intention of the driver.

Accordingly, the processor of the vehicle control device may increase the brake weight by setting the weight corresponding to the gripping variable to the value (e.g., about 100%) exceeding the reference weight corresponding to the gripping variable.

According to another exemplary embodiment of the present disclosure, in the first section 523 of the second graph 521, the weight (e.g., the area weight or the strength weight) corresponding to the gripping variable based on the magnitude of the gripping variable (e.g., the area or the strength) may represent a value (e.g., about 0%) equal to or lower than the reference weight corresponding to the gripping variable.

According to an exemplary embodiment of the present disclosure, in the second section 525 of the second graph 521, the gripping variable (e.g., the area or the strength) and the weight (e.g., the area weight or the strength weight) corresponding to the gripping variable may have a correlation in which the weight corresponding to the gripping variable increases as the gripping variable increases.

Although the area weight and the strength weight are referred to as being calculated independently in FIGS. 5A, 5B and 5C, the exemplary embodiment of the present disclosure may not be limited thereto. According to an exemplary embodiment of the present disclosure, the processor of the vehicle control device may be configured to determine the gripping weight based on the area of gripping the steering wheel and the strength of gripping the steering wheel. The processor of the vehicle control device may be configured to determine the brake weight based on the gripping weight.

According to an exemplary embodiment of the present disclosure, the gripping weight may be identified as in Table 2 below, but the exemplary embodiment of the present disclosure may not be limited thereto. According to an exemplary embodiment of the present disclosure, the value of the gripping weight may be changed. Hereinafter, a first area may be greater than a second area. A first strength may be greater than a second strength.

TABLE 2

| Area | Strength | Gripping weight |
|---|---|---|
| First area (both hands using state) | First strength (gripping state) | Specified value of about 100% |
| Second area (one hand using state) | First strength (gripping state) | Specified value of about 80% |
| First area (both hands using state) | Second strength (touch state) | Specified value of about 50% |
| Second area (one hand using state) | Second strength (touch state) | Specified value of about 0% |

Figure 6:
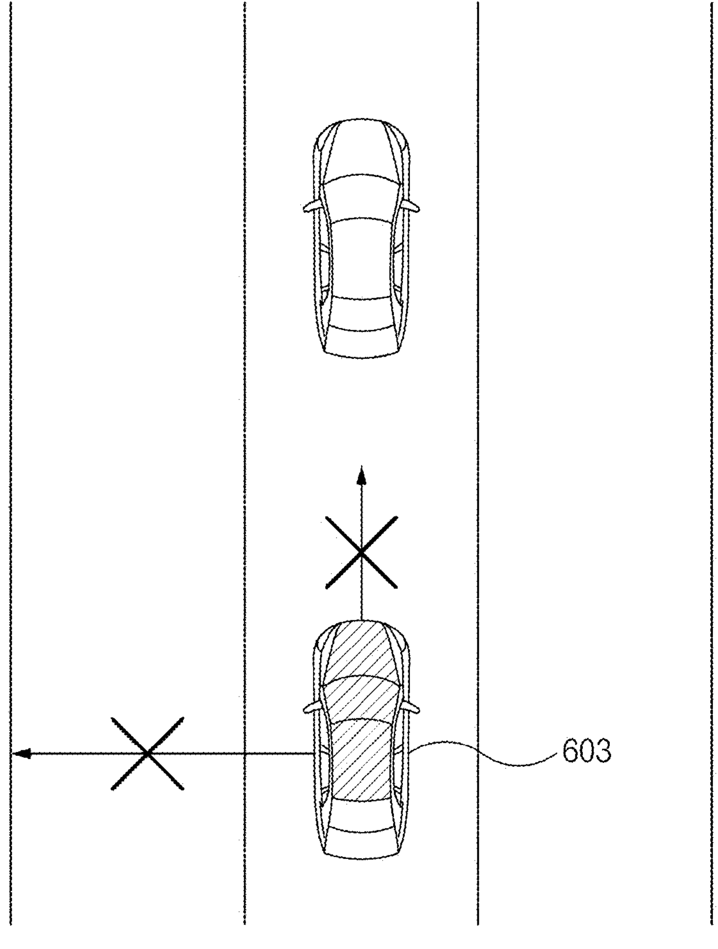
FIG. 6 shows an example of state weight determination based on a state of a host vehicle that needs to change a subject in control over a vehicle control device or a vehicle control method according to an exemplary embodiment of the present disclosure.

FIG. 6 shows an example of state weight determination based in a state of a host vehicle that needs to change a subject in control over a vehicle control device or a vehicle control method according to an exemplary embodiment of the present disclosure. The processor of the vehicle control device may be configured to determine the brake weight based on the state weight determined based on the state of the host vehicle.

Referring to FIG. 6, in a situation 601, the processor of the vehicle control device of a host vehicle 603 may be configured to determine a state of the host vehicle 603 based on whether there is a need to change the subject in the control over the driving of the host vehicle from the system that performs the autonomous driving to the driver and a reason to change the subject in the control over the driving of the host vehicle from the system that performs the autonomous driving to the driver. The processor of the vehicle control device may be configured to determine the brake weight based on the state weight determined based on the state of the host vehicle 603.

According to an exemplary embodiment of the present disclosure, when there is the need to change the subject in the control over the driving of the host vehicle from the system that performs the autonomous driving to the driver based on a cause other than a failure of the autonomous driving device, the state of the host vehicle 603 may be determined as a first state. For example, the first state may include a state in which the driver has not fastened a seat belt. As an exemplary embodiment of the present disclosure, the first state may include a state in which the driver has pressed a start button during the autonomous driving.

According to an exemplary embodiment of the present disclosure, when there is the need to change the subject in the control over the driving of the host vehicle 603 from the autonomous driving system to the driver based on the failure of the autonomous driving device, the state of the host vehicle may be determined to be a second state. For example, the second state may include a failure state in which a lane maintenance or a lane change is not able to be performed under the autonomous driving control. For example, the second state may include a failure state in which a maintenance of an inter-vehicle distance from a preceding vehicle is not able to be performed under the autonomous driving control. For example, the second state may include a state in which a sensor (e.g., the camera, a radio detection and ranging (RADAR), or a Light Detection and Ranging (LiDAR)) that identifies the surrounding environment of the host vehicle is broken under the autonomous driving control. For example, the second state may include a state in which a driving control actuator (e.g., motor driven power steering (MDPS) and electric stability control (ESC)) is broken under the autonomous driving control.

According to an exemplary embodiment of the present disclosure, the processor of the vehicle control device may determine, as the state weight, a third value determined based on the state of the host vehicle 603 being a state in which there is no need to change the subject in the control over the driving of the host vehicle from the system that performs the autonomous driving to the driver.

According to an exemplary embodiment of the present disclosure, the processor of the vehicle control device may determine, as the state weight, a fourth value determined based on the state of the host vehicle 603 being the first state in which there is the need to change the subject in the control over the driving of the host vehicle from the system that performs the autonomous driving to the driver depending on the cause other than the failure of the autonomous driving device.

According to an exemplary embodiment of the present disclosure, the processor of the vehicle control device may determine, as the state weight, a fifth value determined based on the state of the host vehicle 603 being the second state in which there is the need to change the subject in the control over the driving of the host vehicle from the system that performs the autonomous driving to the driver based on the failure of the autonomous driving device.

According to an exemplary embodiment of the present disclosure, the third value (e.g., a specified value lower than 80%) may be smaller than the fourth value (e.g., a specified value equal to or greater than about 80% and lower than about 100%), and the fourth value may be smaller than the fifth value (a specified value of about 100%).

According to an exemplary embodiment of the present disclosure, the state weight may be identified as shown in Table 3 below, but the exemplary embodiment of the present disclosure may not be limited thereto. According to an exemplary embodiment of the present disclosure, a state weight based on the first state and a state weight based on the second state may be changed.

TABLE 3

| State of host vehicle | State weight |
|---|---|
| State other than first state and second state | Specified value lower than about 80% |
| First state | Specified value equal to or greater than about 80% and lower than about 100% |
| Second state | Specified value of about 100% |

Figure 7A:
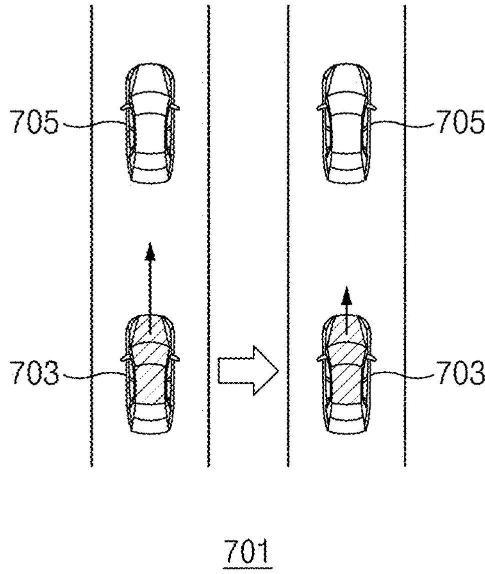
FIG. 7A and FIG. 7B show examples of deceleration weight determination based on a deceleration value controlled based on autonomous driving in a vehicle control device or a vehicle control method according to an exemplary embodiment of the present disclosure.
Figure 7B:
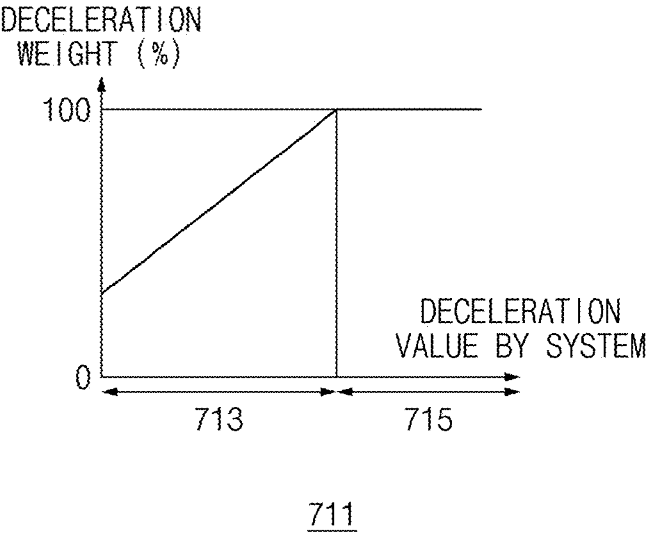

FIG. 7A and FIG. 7B show examples of deceleration weight determination based on a deceleration value controlled based on autonomous driving in a vehicle control device or a vehicle control method according to an exemplary embodiment of the present disclosure. The processor of the vehicle control device may be configured to determine the brake weight based on the deceleration weight determined based on the deceleration value controlled by the autonomous driving system. The deceleration value controlled based on the autonomous driving may be referred to as the deceleration value controlled by the autonomous driving system.

Referring to FIG. 7A and FIG. 7B, in a situation 701, a host vehicle 703 may be controlled by the autonomous driving system to decelerate to maintain a distance from a preceding vehicle 705. A graph 711 may represent the deceleration weight based on the deceleration value by the autonomous driving system. The graph 711 may be classified into a first section 713 and a second section 715.

According to an exemplary embodiment of the present disclosure, in the first section 713 of the first graph 711, the deceleration weight based on the deceleration value of the host vehicle set by the autonomous driving system may have a correlation in which the deceleration weight increases as the deceleration value increases. This is because, as the deceleration value decreases, the control over the driving of the host vehicle may be granted with a smaller amount of operation of the brake pedal.

Therefore, the processor of the vehicle control device may increase the brake weight as the deceleration value increases by setting the deceleration weight to increase proportionally as the deceleration value of the host vehicle set by the autonomous driving system increases.

According to an exemplary embodiment of the present disclosure, in the second section 715 of the graph 711, the deceleration weight based on the deceleration value of the host vehicle set by the autonomous driving system may represent a value (e.g., about 100%) exceeding the reference deceleration weight. This is because, when the deceleration value of the host vehicle set by the autonomous driving system exceeds a ninth specified value, a probability that the host vehicle decelerates based on the driver operating the brake pedal with an amount of operation smaller than the specified value regardless of the intention of the driver is reduced.

Accordingly, the processor of the vehicle control device may increase the brake weight by setting the deceleration weight to a value (e.g., about 100%) exceeding the reference deceleration weight.

Figure 8:
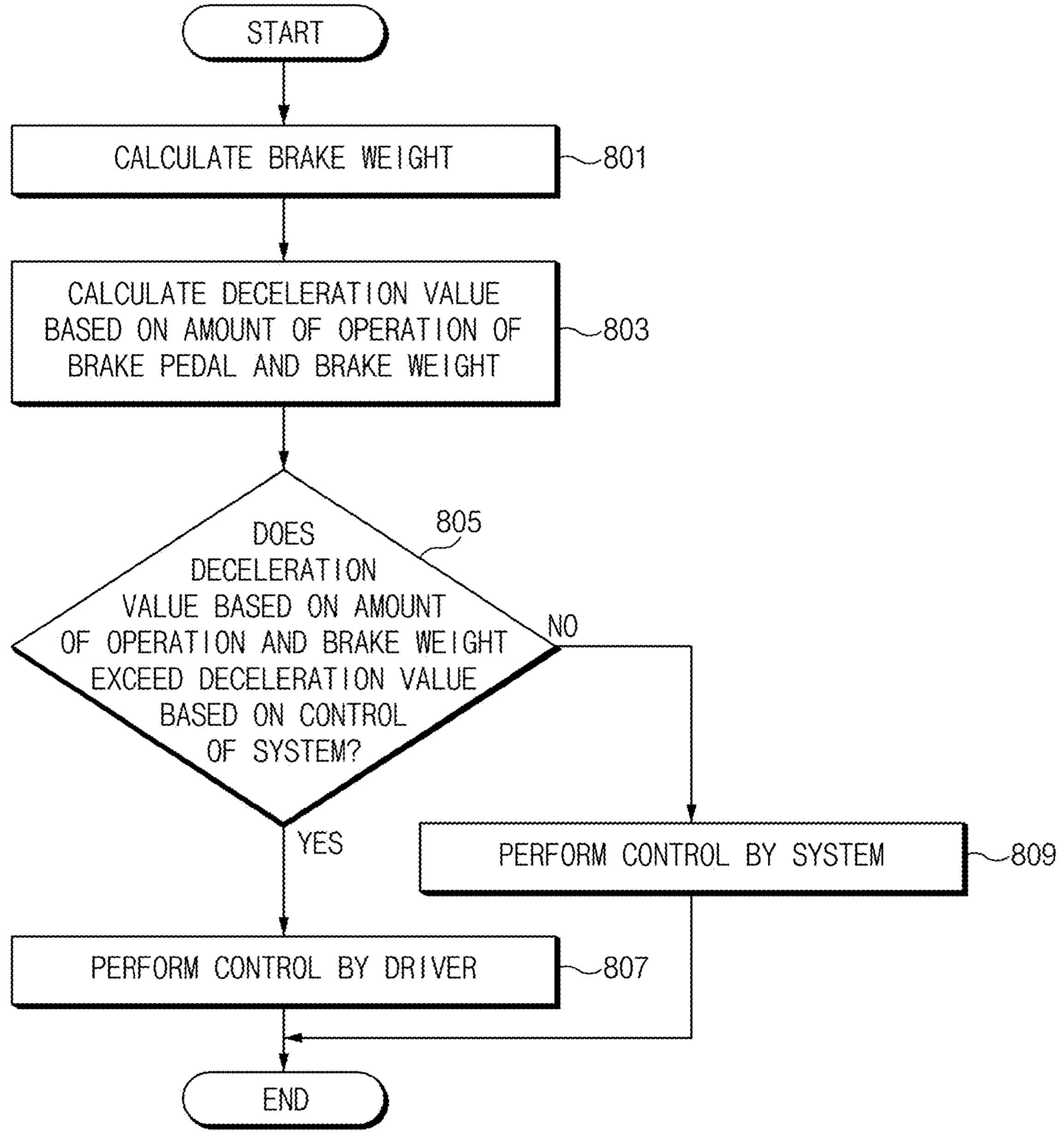
FIG. 8 is a flowchart of operations of a vehicle control device for determining whether to change a subject in control over operation to a driver based on a brake weight in a vehicle control device or a vehicle control method according to an exemplary embodiment of the present disclosure.

FIG. 8 is a flowchart of operations of a vehicle control device for determining whether to change a subject in control over operation to a driver based on a brake weight in a vehicle control device or a vehicle control method according to an exemplary embodiment of the present disclosure.

Hereinafter, it is assumed that the vehicle control device 101 in FIG. 1 is configured to perform a process in FIG. 8. Additionally, in a description of FIG. 8, operations referred to as being performed by the vehicle control device may be understood as being controlled by the processor 107 of the vehicle control device 101.

Referring to FIG. 8, in a first operation 801, the processor of the vehicle control device according to various exemplary embodiments of the present disclosure may be configured to determine the brake weight. The brake weight may be determined based on a product of at least one of the amount of operation weight based on the amount of operation of the brake pedal, the direction weight based on the gaze of the driver, the angle weight based on the gaze of the driver, the distance weight based on the gaze of the driver, the gripping weight based on the input of gripping the steering wheel, the area weight based on the area of the input of the driver's gripping the steering wheel, the strength weight based on the strength of the input of gripping the steering wheel, or the deceleration weight based on the deceleration value controlled by the autonomous driving system, or any combination thereof.

For example, when the processor of the vehicle control device determines the brake weight considering the amount of operation of the brake pedal and the area of the input of the driver's gripping the steering wheel, the brake weight may be determined based on a product of the amount of operation weight and the area weight. For example, when the processor of the vehicle control device determines the brake weight considering the amount of operation of the brake pedal and the strength of the input of gripping the steering wheel, the brake weight may be determined based on a product of the amount of operation weight and the strength weight.

In a second operation 803, the processor of the vehicle control device according to various exemplary embodiments of the present disclosure may be configured to determine the deceleration value based on the amount of operation of the brake pedal and the brake weight. For example, the processor of the vehicle control device may identify a value obtained by multiplying the deceleration value based on the amount of operation of the brake pedal by the brake weight.

In a third operation 805, the processor of the vehicle control device according to various exemplary embodiments of the present disclosure may be configured to determine whether the deceleration value based on the amount of operation and the brake weight exceeds the deceleration value based on the control of the system. When the deceleration value based on the amount of operation and the brake weight exceeds the deceleration value based on the control of the system, the processor of the vehicle control device may perform a fourth operation 807. When the deceleration value based on the amount of operation and the brake weight is equal to or smaller than the deceleration value based on the control of the system, the processor of the vehicle control device may perform a fifth operation 809.

In the fourth operation 807, the processor of the vehicle control device according to various exemplary embodiments of the present disclosure may perform control by the driver. The control over the driving of the host vehicle may include the control over the driving direction of the host vehicle or the control over the driving speed of the host vehicle.

According to an exemplary embodiment of the present disclosure, the processor of the vehicle control device may be configured for controlling the speed of the host vehicle based on the deceleration determined based on the amount of operation, based on the deceleration value determined based on the amount of operation and the brake weight exceeding the deceleration value controlled by the autonomous driving system.

For example, when the value obtained by multiplying the deceleration value determined based on the amount of operation by the brake weight exceeds the deceleration value controlled by the autonomous driving system, the processor of the vehicle control device may be configured for controlling the speed of the host vehicle based on the deceleration value determined based on the amount of operation.

According to an exemplary embodiment of the present disclosure, the processor of the vehicle control device may be configured for controlling a speed of the host vehicle at a specific time point based on a deceleration determined based on a deceleration which is determined based on a difference between the deceleration value determined based on the amount of operation and the brake weight and the deceleration value controlled based on the autonomous driving, and a time duration from a time point at which the subject in the control is changed to the driver to the specific time point, based on the value determined based on the amount of operation and the brake weight exceeding the deceleration value controlled by the autonomous driving system.

For example, when the value obtained by multiplying the deceleration value determined based on the amount of operation by the brake weight exceeds the deceleration value controlled by the autonomous driving system, the processor of the vehicle control device may be configured to determine the speed of the host vehicle at the specific time point based on a sum of the deceleration value controlled by the autonomous driving system and a value obtained by multiplying the time duration from the time point at which the subject in the control is changed to the driver to the specific time point by a certain ratio. As an exemplary embodiment of the present disclosure, the certain ratio may be a value of a difference between the value obtained by multiplying the deceleration value determined based on the amount of operation by the brake weight and the deceleration value controlled by the autonomous driving system, divided by a specified time interval. As an exemplary embodiment of the present disclosure, the certain ratio may be a specified ratio.

In the fifth operation 809, the processor of the vehicle control device according to various exemplary embodiments of the present disclosure may perform control by the system. In other words, the processor of the vehicle control device may maintain the control over the driving of the host vehicle granted to the autonomous driving system, and may not change the subject in the control over the driving of the host vehicle from the system that performs the autonomous driving to the driver.

Figure 9:
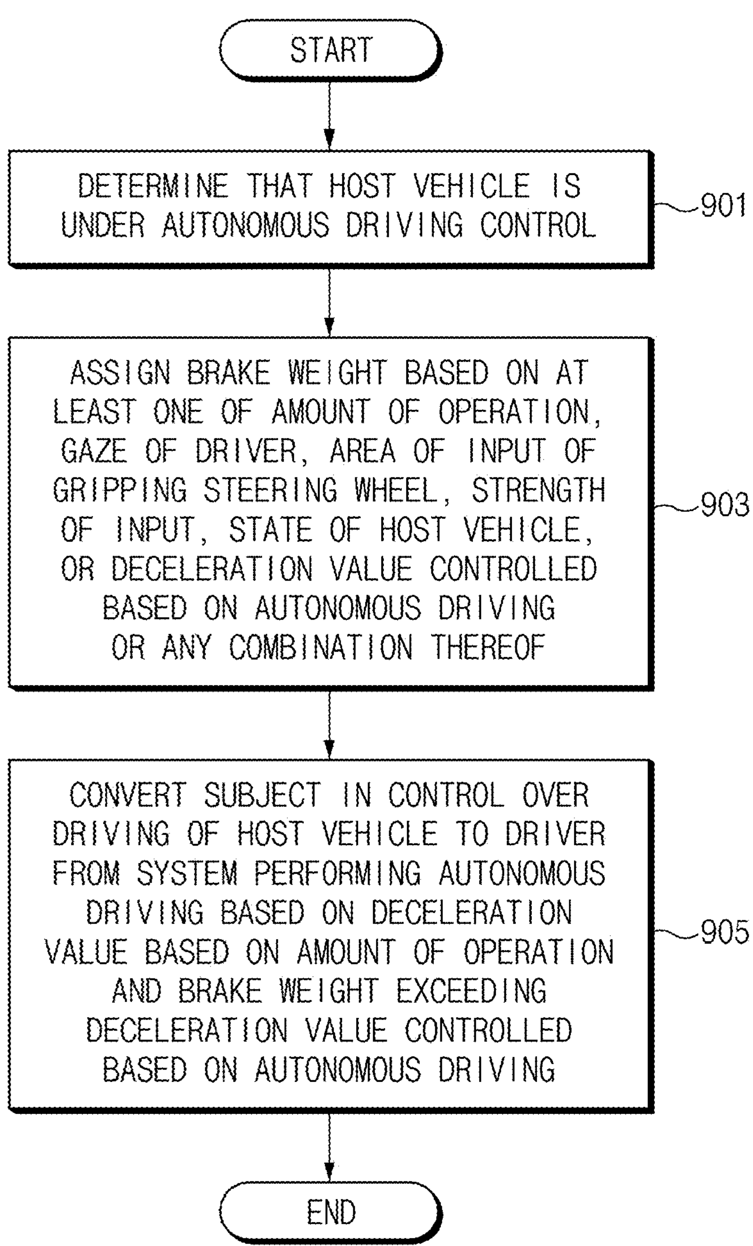
FIG. 9 is a flowchart of operations of a vehicle control device for changing a subject in control over driving of a host vehicle from a system that is configured to perform autonomous driving to a driver based on a brake weight in a vehicle control device or a vehicle control method according to an exemplary embodiment of the present disclosure.

FIG. 9 is a flowchart of operations of a vehicle control device for changing a subject in control over driving of a host vehicle from a system that performs autonomous driving to a driver based on a brake weight in a vehicle control device or a vehicle control method according to an exemplary embodiment of the present disclosure.

Hereinafter, it is assumed that the vehicle control device 101 in FIG. 1 performs a process in FIG. 9. Additionally, in a description of FIG. 9, an operation referred to as being performed by the vehicle control device may be understood as being controlled by the processor 107 in the vehicle control device 101.

Referring to FIG. 9, in a first operation 901, the processor of the vehicle control device according to various exemplary embodiments of the present disclosure may be configured to determine that the host vehicle is under the autonomous driving control.

In a second operation 903, the processor of the vehicle control device according to various exemplary embodiments of the present disclosure may be configured to determine the brake weight based on at least one of the amount of operation, the gaze of the driver, the area of the input of the driver's gripping the steering wheel, the strength of the input, the state of the host vehicle, or the deceleration value controlled based on the autonomous driving, or any combination thereof. The amount of operation may refer to the amount of operation of the brake pedal. The strength of the input may represent the strength of the input of gripping the steering wheel.

In a third operation 905, the processor of the vehicle control device according to various exemplary embodiments of the present disclosure may change the subject in the control over the driving of the host vehicle from the system that performs the autonomous driving to the driver based on the deceleration value based on the amount of operation and the brake weight exceeding the deceleration value controlled based on the autonomous driving.

Figure 10:
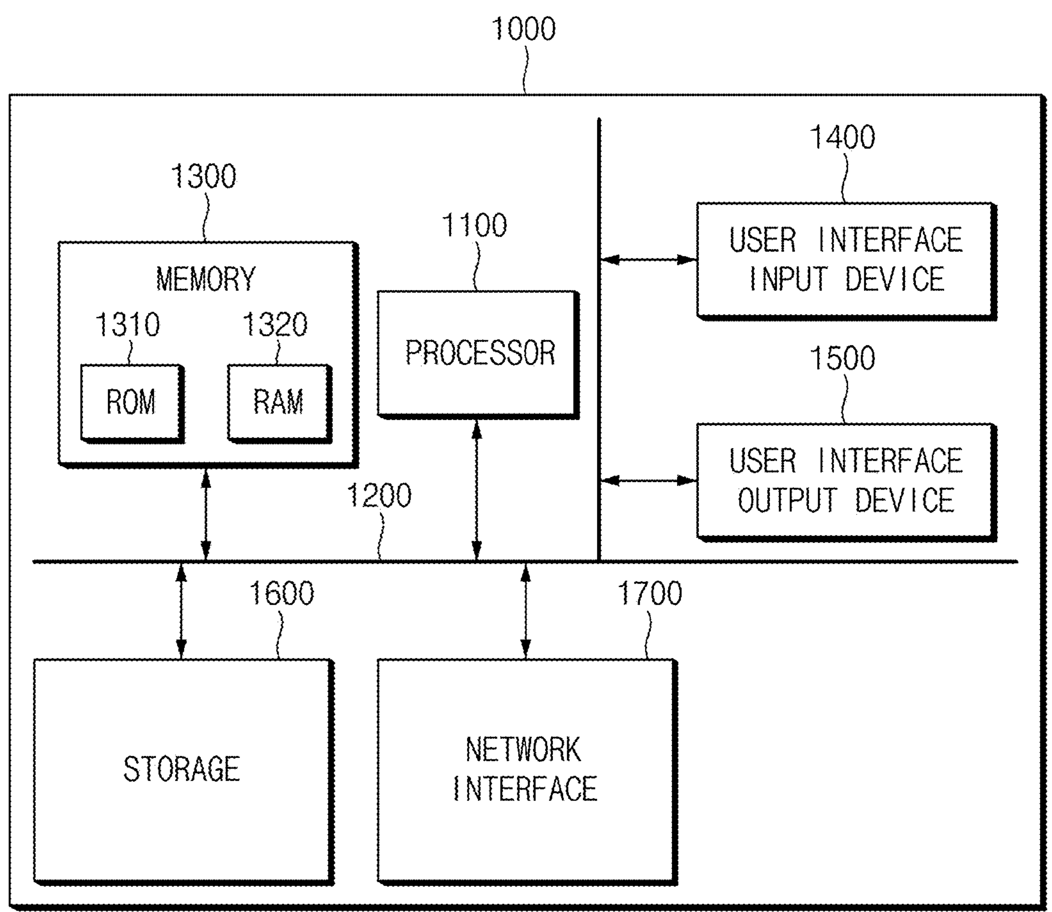
FIG. 10 illustrates a computing system related to a vehicle control device or a vehicle control method according to an exemplary embodiment of the present disclosure.

FIG. 10 illustrates a computing system related to a vehicle control device or a vehicle control method according to an exemplary embodiment of the present disclosure.

With reference to FIG. 10, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments included in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology may determine whether the brake pedal has been operated based on the intention of the driver based on the gaze of the driver under the autonomous driving control.

Furthermore, the present technology may determine whether the brake pedal has been operated based on the intention of the driver based on the area of the input of gripping the steering wheel under the autonomous driving control.

In addition, the present technology may determine whether the brake pedal has been operated based on the intention of the driver based on the strength of the input of gripping the steering wheel under the autonomous driving control.

In addition, the present technology may determine whether the brake pedal has been operated based on the intention of the driver when in the specified state in which there is the need to change the subject in the control over the operation from the autonomous driving system to the driver under the autonomous driving control.

In addition, the present technology may determine whether the brake pedal has been operated based on the intention of the driver based on the deceleration value controlled based on the autonomous driving under the autonomous driving control.

Furthermore, the technology may lower the risk of the accident resulted from the operation of the brake pedal unintended by the driver under the autonomous driving control.

Furthermore, various effects that are directly or indirectly identified through the present specification may be provided.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a vehicle, the apparatus comprising:
- a brake pedal configured to specify a deceleration of a host vehicle;
- a steering wheel configured to specify a driving direction of the host vehicle; and
- a processor,
- wherein the processor is configured to:
  - determine that the host vehicle is under autonomous driving control;
  - determine a brake weight based on at least one of an amount of operation of the brake pedal, a gaze of a driver, an area of an input of the driver's gripping the steering wheel, a strength of the input, a state of the host vehicle, or a deceleration value of the host vehicle controlled based on the autonomous driving, or any combination thereof; and
  - change a subject in control over driving of the host vehicle from a system performing the autonomous driving to the driver based on the deceleration value based on the amount of operation and the brake weight exceeding the deceleration value, wherein the processor, which is configured to determine the brake weight, is further configured to:

determine, as a direction weight, a first value determined based on a point corresponding to the gaze of the driver being included in a specified area;

determine, as the direction weight, a second value determined based on the point not being included in the specified area; and determine the brake weight based on the direction weight.

2. The apparatus of claim 1, wherein the processor is further configured to determine the brake weight based on an amount of operation weight determined based on the amount of operation, and wherein the amount of operation and the amount of operation weight have a correlation, in which the amount of operation weight increases as the amount of operation increases in a state that the amount of operation is included in a predetermined amount of operation range.

3. The apparatus of claim 1, wherein the processor is further configured to:

determine an angle between a straight line corresponding to a direction of the gaze of the driver and a straight line for connecting a point corresponding to the predetermined area with the driver; and determine the brake weight based on an angle weight determined based on the angle, wherein the angle and the angle weight have a correlation, in which the angle weight decreases as the angle increases.

4. The apparatus of claim 1, wherein the processor is further configured to:

determine a shortest distance among distances from a point on a windshield of the host vehicle corresponding to a direction of the gaze of the driver to a boundary of the predetermined area; and determine the brake weight based on a distance weight determined based on the shortest distance, wherein the shortest distance and the distance weight have a correlation, in which the distance weight decreases as the shortest distance increases.

5. The apparatus of claim 1, wherein the processor is further configured to determine the brake weight based on an area weight determined based on the area, and wherein the area and the area weight have a correlation, in which the area weight increases as the area increases.

6. The apparatus of claim 1, wherein the processor is further configured to determine the brake weight based on a strength weight determined based on the strength, and wherein the strength and the strength weight have a correlation, in which the strength weight increases as the strength increases.

7. The apparatus of claim 1, wherein the processor is further configured to:

determine, as a state weight, a third value determined based on the host vehicle not being in a predetermined first state and a predetermined second state;

determine, as the state weight, a fourth value determined based on the host vehicle being in the first state;

determine, as the state weight, a fifth value determined based on the host vehicle being in the second state; and determine the brake weight based on the state weight, wherein the third value is smaller than the fourth value, wherein the fourth value is smaller than the fifth value, wherein the first state includes a state where there is a need to change the subject in the control over the driving of the host vehicle from the system performing the autonomous driving to the driver because of a cause other than a failure of an autonomous driving device, wherein the second state includes a state where there is a need to change the subject in the control over the driving of the host vehicle from the system performing the autonomous driving to the driver because of the failure.

8. The apparatus of claim 1, wherein the processor is further configured to determine the brake weight based on a deceleration weight determined based on the deceleration value, and wherein the deceleration value and the deceleration weight have a correlation, in which the deceleration weight increases as the deceleration value increases when the deceleration value is included in a predetermined deceleration range.

9. The apparatus of claim 1, wherein the processor is further configured to control a speed of the host vehicle based on a deceleration determined based on the amount of operation, based on the deceleration value determined based on the amount of operation and the brake weight exceeding the deceleration value.

10. The apparatus of claim 1, wherein the processor is further configured to control a speed of the host vehicle at a predetermined time point based on a deceleration determined based on a difference between the deceleration value determined based on the amount of operation and the brake weight and the deceleration value controlled based on the autonomous driving, and a time duration from when the subject in the control is changed to the driver to the predetermined time point, based on the deceleration value determined based on the amount of operation and the brake weight exceeding the deceleration value controlled based on the autonomous driving.

11. A method for controlling a vehicle, the method comprising:

determining, by a processor, that a host vehicle is under autonomous driving control;

determining, by the processor, a brake weight based on at least one of an amount of operation of a brake pedal, a gaze of a driver, an area of an input of the driver's gripping a steering wheel, a strength of the input, a state of the host vehicle, or a deceleration value of the host vehicle controlled based on the autonomous driving, or any combination thereof, and changing, by the processor, a subject in control over driving of the host vehicle from a system performing the autonomous driving to the driver based on the deceleration value based on the amount of operation and the brake weight exceeding the deceleration value, wherein the determining of the brake weight based on at least one of the amount of operation of the brake pedal, the gaze of the driver, the area of the input of gripping the steering wheel, the strength of the input, the state of the host vehicle, or the deceleration value controlled based on the autonomous driving, or any combination thereof further includes:

determining, as a direction weight, a first value determined based on a point corresponding to the gaze of the driver being included in a specified area;

determining, as the direction weight, a second value determined based on the point not being included in the specified area; and determining the brake weight based on the direction weight.

12. The method of claim 11, wherein the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof includes:

determining the brake weight based on an amount of operation weight determined based on the amount of operation, wherein the amount of operation and the amount of operation weight have a correlation, in which the amount of operation weight increases as the amount of operation increases in a state that the amount of operation is included in a predetermined amount of operation range.

13. The method of claim 11, wherein the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof includes:

determining an angle between a straight line corresponding to a direction of the gaze of the driver and a straight line for connecting a point corresponding to the predetermined area with the driver; and determining the brake weight based on an angle weight determined based on the angle, wherein the angle and the angle weight have a correlation, in which the angle weight decreases as the angle increases.

14. The method of claim 11, wherein the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof includes:

determining a shortest distance among distances from a point on a windshield of the host vehicle corresponding to a direction of the gaze of the driver to a boundary of the predetermined area; and determining the brake weight based on a distance weight determined based on the shortest distance, wherein the shortest distance and the distance weight have a correlation, in which the distance weight decreases as the shortest distance increases.

15. The method of claim 11, wherein the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof includes:

determining the brake weight based on an area weight determined based on the area, wherein the area and the area weight have a correlation, in which the area weight increases as the area increases.

16. The method of claim 11, wherein the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof includes:

determining the brake weight based on a strength weight determined based on the strength, wherein the strength and the strength weight have a correlation, in which the strength weight increases as the strength increases.

17. The method of claim 11, wherein the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof includes:

determining, as a state weight, a third value determined based on the host vehicle not being in a predetermined first state and a predetermined second state;

determining, as the state weight, a fourth value determined based on the host vehicle being in the first state;

determining, as the state weight, a fifth value determined based on the host vehicle being in the second state; and determining the brake weight based on the state weight, wherein the third value is smaller than the fourth value, wherein the fourth value is smaller than the fifth value, wherein the first state includes a state where there is a need to change the subject in the control over the driving of the host vehicle from the system performing the autonomous driving to the driver because of a cause other than a failure of an autonomous driving device, wherein the second state includes a state where there is a need to change the subject in the control over the driving of the host vehicle from the system performing the autonomous driving to the driver because of the failure.

18. The method of claim 11, wherein the determining of the brake weight based on at least one of the amount of operation of the brake pedal, the gaze of the driver, the area of the input of the driver's gripping the steering wheel, the strength of the input, the state of the host vehicle, or the deceleration value controlled based on the autonomous driving, or any combination thereof includes:

determining the brake weight based on a deceleration weight determined based on the deceleration value, wherein the deceleration value and the deceleration weight have a correlation, in which the deceleration weight increases as the deceleration value increases when the deceleration value is included in a predetermined deceleration range.

* * * * *